May 2, 1961 F. J. GLIEBE 2,982,586
FISHING NET CONSTRUCTION
Filed Aug. 7, 1959
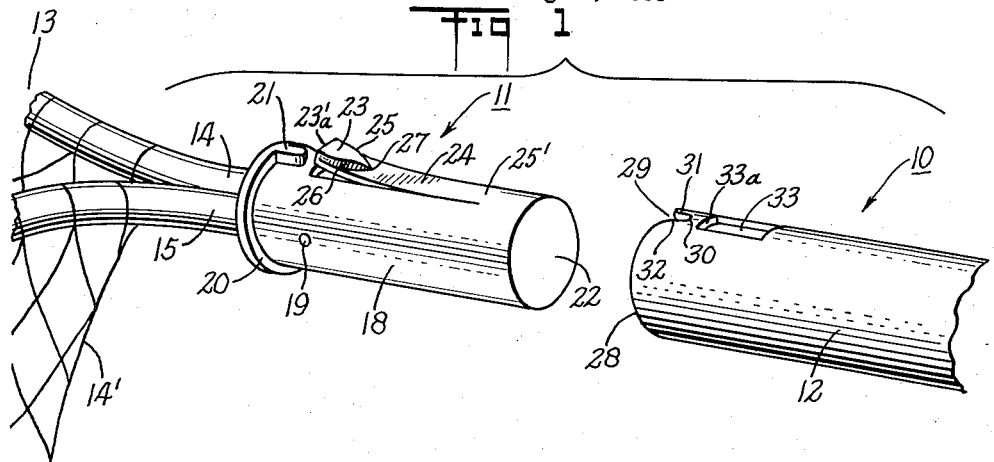
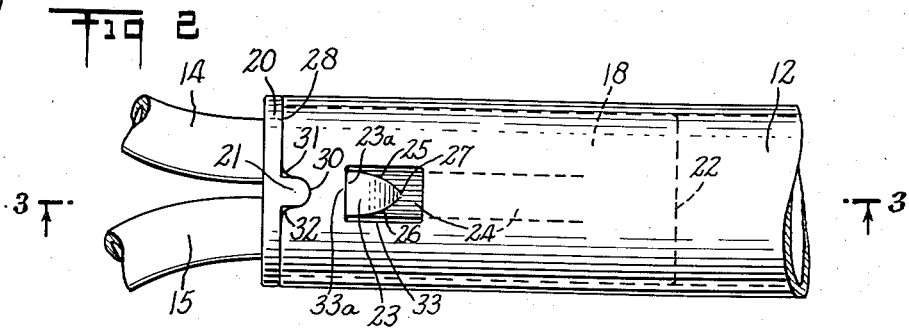
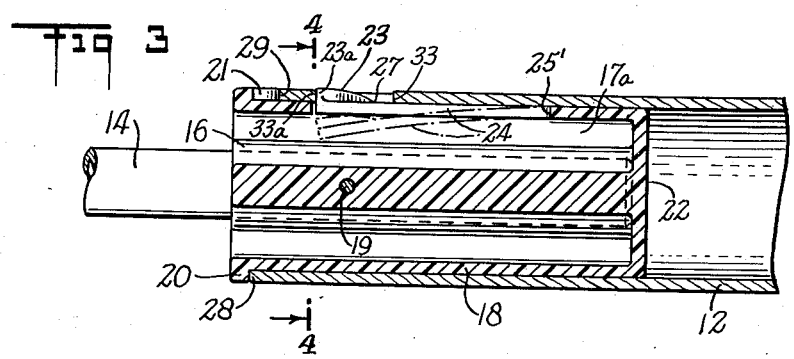
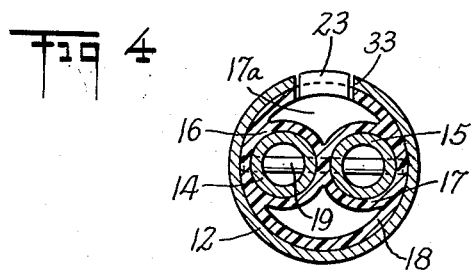
INVENTOR
Francis J. Gliebe
BY Mark Bassecher
his ATTORNEY United States Patent Office 2,982,586
Patented May 2, 1961

2,982,586
FISHING NET CONSTRUCTION
Francis J. Gliebe, 1154 Myrtle Ave., Jamaica, N.Y.
Filed Aug. 7, 1959, Ser. No. 832,262
4 Claims. (Cl. 306—28)

This invention relates to a fish net assembly, and more particularly to a fish net assembly of the type used by fishermen to net and snare fish which have been reeled in on a fishing line to a position in close proximity to the fisherman.

Still more particularly, this invention relates to a fishing net assembly of the type described having a demountable or removable handle for convenience of storage when the assembly is not in use. This invention relates further to a novel connector means for a fish net assembly of the type described, which permits a net portion and a handle portion to be securely and rapidly assembled to a completed unit, and just as speedily separated, to provide compactness in storage.

Accordingly, this invention has for an object thereof the provision of a fishing net assembly having a demountable handle portion. A further object of this invention is to provide an assembly of the type described having novel connection means, facilitating speedy and secure connection between the net and handle portions of the assembly.

A further object of this invention is to provide a connector assembly as previously described, having means separate from the parts holding the net and handle in engagement, for communicating torsional stresses applied to one part to the other part, whereby such stresses will not affect the first mentioned parts.

Still a further object of this invention is to provide a connector assembly for a device of the class described having cam portions to facilitate alignment of the gripping parts of the assembly.

Reference is made to the accompanying drawings, forming a part hereof, in which—

Figure 1 is a fragmentary perspective view of the net assembly showing the connector portions of the device prior to engagement;

Figure 2 is a magnified plan view of the connector portions of the net assembled in mated position;

Figure 3 is a section taken on the lines 3—3 of Figure 2;

Figure 4 is a section taken on the lines 4—4 of Figure 3.

The net assembly comprises a handle portion 10 and a net unit 11, adapted to be attached to the handle 10 or separated therefrom for storage. Only a portion of the handle 10 has been shown since the remaining unillustrated parts thereof are of completely conventional design and comprise an extension of the illustrated tubular member 12, having a conventional rubber or plastic grip at the end.

The net unit 11 includes a generally annular or ovoidal frame 13, having a depending net 14' supported thereon in the usual manner. The frame 13 terminates in a pair of parallel end portions 14, 15. The frame 13 is secured within tubular sockets 16, 17, formed in the tubular plug or connector part 18 of the net unit 11. A cross pin 19 which pierces end portions 14, 15 and tubular sockets 16, 17, retains the frame 13 securely within the plug or connector part 18.

The plug 18, which is preferably made of nylon or a similar resilient, corrosion resisting material, is provided, at the net adjacent end, with an annular flange providing a shoulder or abutment 20. A raised keying lug 21 extends from the shoulder 20 forwardly or toward the end 22 of the connector or plug 18. The plug 18 is provided, in addition, with an outwardly biased projecting dog 23, preferably but not necessarily formed integrally with the resilient plug 18 by scoring or cutting through the walls of the said plug to provide a tongue 24 separated from the plug except at its forward end 25', and is unsupported by the cavity 17a up to the sockets 16 and 17. The tongue may be integrally molded with the plug and bent into effective biasing position, as will be readily understood.

Atop the tongue 24 there is provided a pair of projecting cam faces 25, 26, which converge to define a forwardly directed point 27. As best seen from Figure 3, the leading edge of the point 27 is flush with the outer surface of the tongue 24.

The tubular portion 12 of the handle assembly 10 is of an inside diameter adapted to provide a close telescoping fit for the tubular plug 18 of the net assembly 11. The leading edge 28 of the tube 12 is provided with a cutout 29, the said cutout having a rounded rearward portion 30 (see Figure 2) and diverging cam portions 31, 32, providing a wide mouth at the leading edge 28. Rearwardly of the cutout 29, there is located a keeper slot 33, the lateral extent of such slot being sufficiently greater than the lateral dimension of the dog 23 to provide lateral clearance when the dog is projected into the keeper slot (see Figures 2 and 4). Contrariwise, the lug 21 and the rearward portion 30 of the cutout 29 are dimensioned to provide a very close fit, with minimal clearance in the inserted position shown in Figure 2.

To assemble the separated parts 10 and 11 positioned as shown in Figure 1, it is merely necessary approximately to align the dog 23 of the net assembly 11 with the keeper slot 33 of the handle 10 and sleeve the tube 12 longitudinally over the plug 18. The reaction of cam faces 25, 26 of the dogs 23 and 31, 32 of the cutout 29 automatically effects accurate alignment of the dog and keeper slot by causing corrective rotation if the aforesaid parts are initially misaligned. When complete insertion of the plug 18 within the tube 12 is accomplished, the shoulder 20 of the plug will be adjacent the leading edge 28 of the handle, the lug 21 will be tightly wedged in the cutout portion 30, and the dog 23 will have been spring projected radially outwardly from the inward position it occupied during the initial sleeving movements, into the keeper slot 33. In this assembled position, the rearward shoulder 23a of the dog 23 engages forward shoulder 33a of the keeper slot 33, preventing separation of the net and handle portions during use of the device. It will be readily recognized from the foregoing that the handle may be demounted from the net portion by forcing the dog 23 radially inwardly of the keeper slot 33 and simultaneously pulling the net and handle apart, while maintaining the dog 23 in the position shown in dot and dash lines in Figure 3.

An important feature of the device is the provision of independent means for linking the net and handle against relative movement under the influence of torsional stresses from the means which lock these parts against longitudinal displacement. By allowing greater lateral clearance between the dog 23 and keeper slot 33 than between the lug 21 and cutout portion 30, all torsional stresses are borne by the latter two parts, the dog 23 being free from any turning moment imparted by one of the units to the other. The absence of torsional stresses from the dog permits the provision of an integrally formed dog construction in which, as described, the dog is formed from the relatively thin resilient material forming one of the tubular connector parts. A dog thus formed has more than adequate strength to prevent longitudinal dislodgement of the net from the handle.

This application, however, is not to be taken as restricted to the use of an integrally formed dog, since the other advantages herein provided may, in a measure, be realized using a separate, spring projected dog.

Having thus described my invention and illustrated its use, what I claim as new and desire to secure by Letters Patent is:

1. In a separable fish net assembly having handle and net portions adapted to be separated for storage, complemental connector means for said portions comprising inner and outer slidably telescoping tube members connected to said net and handle, said inner telescoping tube member including a radially outwardly biased projecting dog having a cam face forming a leading edge for said dog in sliding said outer tube member over said inner tube member, said inner tube member including a trailing abutment portion and a raised keying lug aligned with and in trailing position of said dog, said outer tube member defining on its leading edge a cutout portion and in aligned trailing position with respect to said cutout portion, a keeper slot, said cutout portion including an open mouth portion having diverging camming faces adapted to coact with said dog in telescoping said outer tube member over said inner tube member to center said dog with respect to said keeper slot, said dog and lug, in the telescoped position of said tubes, projecting into and lying within said cutout portion and slot, respectively, said abutment portion lying against said leading edge of said outer tube in said telescoped position of said tubes.

2. A device in accordance with claim 1 wherein the lateral faces of said dog are beveled and converge toward the leading cam edge of said dog.

3. In a separable fish net assembly having handle and net portions adapted to be separated for storage, complemental connector means for said portions comprising inner and outer slidably telescoping tube members connected to said net and handle, said inner telescoping tube member including a radially outwardly biased projecting dog having a cam face forming a leading edge for said dog in sliding said outer tube member over said inner tube member, said inner tube member including a trailing abutment portion and a raised keying lug in trailing position of said dog, said outer tube member defining on its leading edge a cutout portion receiving said keying lug and in trailing position with respect to said cutout portion, a keeper slot receiving said dog, said dog providing a loose fit with said keeper slot and said lug providing a snug fit with said cutout portion in the telescoped position of said tube members whereby torsional strains applied in either direction to one of said tube members will be transmitted to said other tube member through the engagement of said lug and cutout and not through said dog and keeper slot connection.

4. In a separable fish net assembly having handle and net portions adapted to be separated for storage, complemental connector means for said portions comprising inner and outer slidably telescoping tube members connected to said net and handle, said inner telescoping tube member including a radially outwardly biased projecting dog having a cam face forming a leading edge for said dog in sliding said outer tube member over said inner tube member, said inner tube member including a raised keying lug in trailing position of said dog, said lug having axially aligned side wall portions, said outer tube member defining on its leading edge a cutout portion including substantially axially aligned side wall portions receiving said keying lug, a keeper slot in trailing position with respect to said cutout portion and receiving said dog, said dog providing a loose fit with the side walls of said keeper slot and said axial side wall portions of said lug and said cutout providing a snug fit in the telescoped position of said tubes.

References Cited in the file of this patent

UNITED STATES PATENTS

| | | |
|---|---|---|
| 62,057 | Nellis | Feb. 12, 1867 |
| 844,130 | Howard | Feb. 12, 1907 |
| 860,270 | Trewhella | July 16, 1907 |
| 2,210,296 | Kittrell et al. | Aug. 6, 1940 |
| 2,473,388 | Rambo | June 14, 1949 |
| 2,683,321 | Faber | July 13, 1954 |